UNITED STATES PATENT OFFICE.

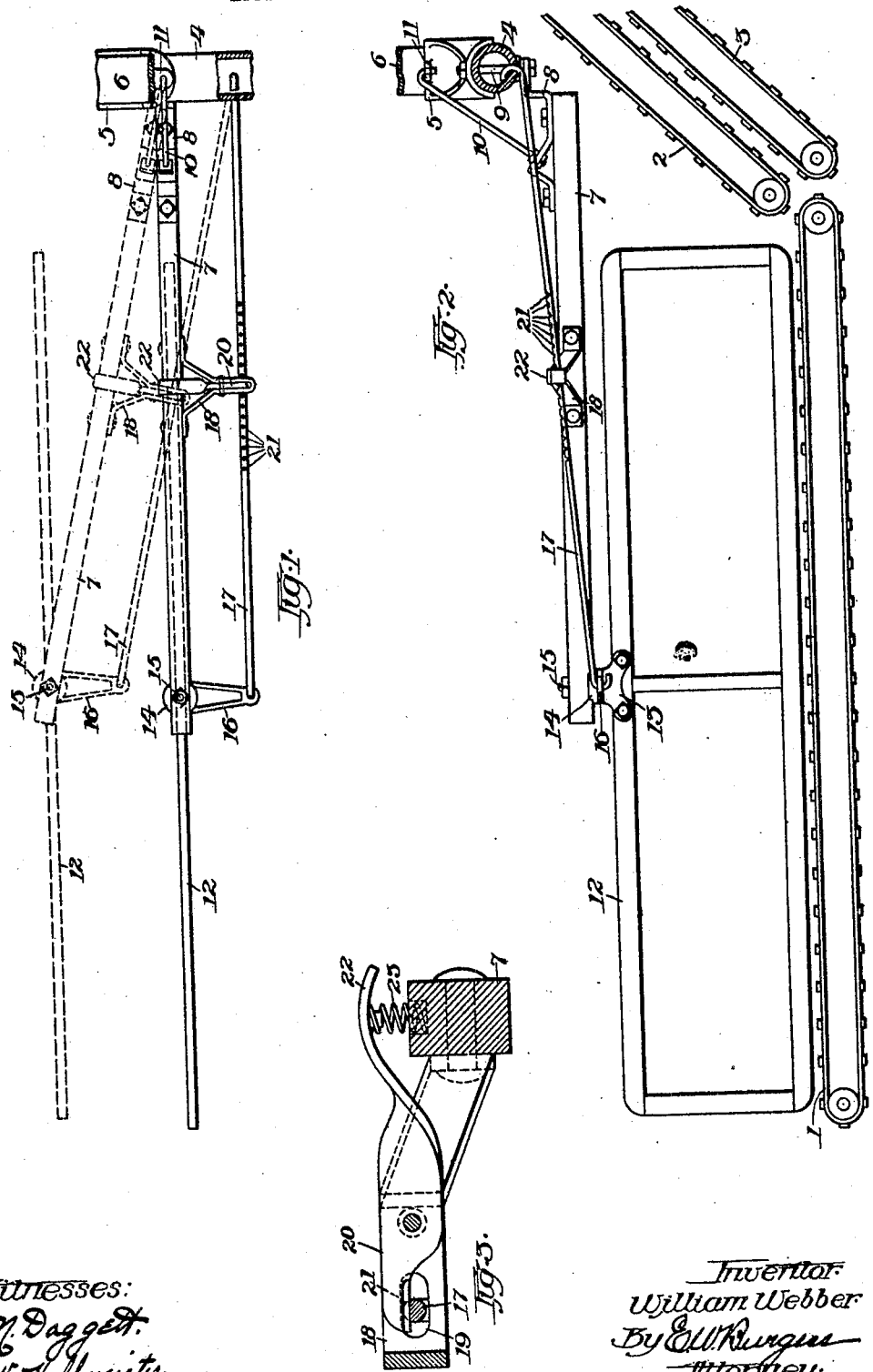

WILLIAM WEBBER, OF CHICAGO, ILLINOIS, ASSIGNOR TO INTERNATIONAL HARVESTER COMPANY, A CORPORATION OF NEW JERSEY.

PLATFORM-FLAG FOR HARVESTERS.

No. 849,442.     Specification of Letters Patent.     Patented April 9, 1907.

Application filed January 21, 1907. Serial No. 353,281.

*To all whom it may concern:*

Be it known that I, WILLIAM WEBBER, a citizen of the United States, residing at Chicago, in the county of Cook and State of Illinois, have invented certain new and useful Improvements in Platform-Flags for Harvesters, of which the following is a specification.

My invention has for its object the adjustment of the backboard or "platform-flag," as it is now called, toward or from the finger-bar, while preserving its parallelism therewith, as will be understood from the following description.

In the drawings, Figure 1 represents a plan view of the platform-flag-supporting means. Fig. 2 represents a rear view of Fig. 1 and part of a harvester-platform and elevator, sufficient to illustrate the improvement; and Fig. 3 represents a detail of the adjusting mechanism.

Similar reference-numerals designate like parts throughout the several views.

1 represents the endless carrier, suitably mounted upon the grain-platform.

2 and 3 represent the upper and lower elevator-carriers, respectively.

4 is a portion of the harvester-frame, commonly termed the "seat-supporting member."

5 is a socket-piece, secured to the frame-piece 4, and 6 represents the lower end of a seat-spring received by the socket-piece.

7 is an arm having its inner end pivotally connected with the frame member 4 by means of the strap 8 and pivot-bolt 9, and 10 is a supplemental support for the arm, having its lower end secured to the strap 8 and its upper end pivotally connected to an ear-piece 11, integral with the socket-piece 5, the axes of the pivotal connections of the arm and the supplemental support being in substantially the same vertical line.

The arm overhangs the grain-platform, and pivotally suspended from its outer end is the platform-flag 12, by means of the connecting members 13 and 14, secured to the flag and arm, respectively, and pivot-bolt 15.

Integral with the part 13 is a rearwardly-extending arm 16, and pivotally connected with the rear end of the arm is one end of a bar 17, having its opposite end pivotally connected with the frame member 4, the bar and arm being arranged parallel with each other in the usual way for the purpose of maintaining the parallelism of the platform-flag and cutting mechanism as the former is adjusted in a fore-and-aft direction relative to the platform, as shown by dotted lines in Fig. 1.

For the purpose of securing the flag in its various positions of adjustment a bracket 18 is secured to the arm 7 intermediate its pivotal connections with the frame member and the platform-flag and projecting rearward therefrom is provided with a slotted opening 19, adapted to loosely receive the middle portion of the bar 17, and a latch-piece 20 is pivotally mounted upon the bracket, having one end adapted to engage with the teeth 21, formed on the bar, and its opposite end having a tailpiece 22 overhanging the arm and within reach of the operator's foot and by which the latch-piece is manipulated, and 23 represents a coiled spring operative between the arm and the tailpiece in a manner to yieldingly hold the latch in engagement with the toothed portion of the bar.

To adjust the platform-flag to any desired position, the operator first places his foot upon the tailpiece of the latch and releases it from engagement with the bar, and then may swing the arm forward or rearward, as desired, and upon removing the pressure the latch will engage the bar and firmly secure the arm and flag in position and prevent relative movement of the arm and bar.

What I claim as my invention, and desire to secure by Letters Patent, is—

1. A platform-flag for harvesters comprising, in combination a harvester-frame and grain-platform, two bars parallel with each other and arranged in substantially the same horizontal plane, said bars having their inner ends pivotally connected with a fixed part of the harvester-frame and their outer ends overhanging the grain-platform, a platform-flag pivotally connected to said outer ends, and releasable locking means carried by one of said bars and adapted to engage with the other in a manner to prevent relative movement of said bars.

2. A platform-flag for harvesters comprising, in combination a harvester-frame and grain-platform, two bars parallel with each other and arranged in substantially the same horizontal plane, said bars having their inner ends pivotally connected with a fixed part of the harvester-frame and their outer ends overhanging the grain-platform, a platform-flag pivotally connected to said outer ends, a pivoted latch carried by one of said bars, and teeth upon the other bar adapted to receive said latch in a manner to prevent relative movement of said bars.

3. A platform-flag for harvesters comprising, in combination a harvester-frame and grain-platform, two bars parallel with each other and arranged substantially in the same horizontal plane, said bars having their inner ends pivotally connected with a fixed part of the harvester-frame and their outer ends overhanging the grain-platform, a platform-flag pivotally connected to said outer ends, a pivoted latch carried by one of said bars, teeth upon the other bar, and a spring operative to yieldingly hold said latch in engagement with the teeth.

4. A platform-flag for harvesters comprising, in combination a harvester-frame and grain-platform, a flag, an arm overhanging the grain-platform and having said flag pivotally suspended from its outer end and its inner end pivotally connected with a fixed part of the harvester, a bar parallel with said arm and arranged in substantially the same horizontal plane, said bar having its outer end pivotally connected with said flag and its inner end pivotally connected with a fixed part of the harvester, a releasable locking mechanism secured to said arm and adapted to engage with said bar in a manner to prevent said bar moving relative to said arm.

5. A platform-flag for harvesters comprising, in combination a harvester-frame and grain-platform, a flag, an arm overhanging the grain-platform and having said flag pivotally suspended from its outer end and its inner end pivotally connected with a fixed part of the harvester, a bar parallel with said arm and arranged in substantially the same horizontal plane, said bar having its outer end pivotally connected with said flag and its inner end pivotally connected with a fixed part of the harvester, a series of teeth on the bar, and a latch pivotally mounted on said arm and adapted to engage with the toothed portion of the bar.

6. A platform-flag for harvesters comprising, in combination a harvester-frame and grain-platform, a flag, an arm overhanging the grain-platform and having said flag pivotally suspended from its outer end and its inner end pivotally connected with a fixed part of the harvester, a bar parallel with said arm and arranged in substantially the same horizontal plane, said bar having its outer and inner ends pivotally connected with said flag and the harvester-frame, respectively, a latch pivotally mounted on said arm, a series of teeth on said bar, said latch adapted to engage with said teeth in a manner to prevent movement of said arm relative to said bar.

7. A platform-flag for harvesters comprising, in combination a harvester-frame and grain-platform, a flag, an arm overhanging the grain-platform and having said flag pivotally suspended from its outer end and its inner end pivotally connected with a fixed part of the harvester, a bar parallel with said arm and arranged in substantially the same horizontal plane, said bar having its outer and inner ends pivotally connected with said flag and a fixed part of the harvester-frame, respectively, a series of teeth on said bar, a latch pivotally mounted on said arm, and a spring operative to yieldingly hold said latch in engagement with said teeth.

8. A platform-flag for harvesters comprising, in combination a harvester-frame and grain-platform, a flag, an arm overhanging the grain-platform and having said flag pivotally suspended from its outer end and its inner end pivotally connected with a fixed part of the harvester, a bar parallel with said arm and arranged in substantially the same horizontal plane, said bar having its outer and inner ends pivotally connected with said flag and a fixed part of the harvester-frame, respectively, a series of teeth on said bar, a bracket secured to said arm and having a slotted opening therein to receive said bar, a latch pivotally mounted on said bracket and having one end adapted to engage with said teeth, and a tailpiece at its opposite end for manipulating said latch.

9. A platform-flag for harvesters comprising, in combination a harvester-frame and grain-platform, a flag, an arm overhanging the grain-platform and having said flag pivotally suspended from its outer end and its inner end pivotally connected with a fixed part of the harvester, a bar parallel with said arm and arranged in substantially the same horizontal plane, said bar having its outer and inner ends pivotally connected with said flag and a fixed part of the harvester-frame, respectively, a series of teeth on said bar, a bracket secured to said arm and having a slotted opening therein adapted to receive said bar, a latch pivotally mounted on said bracket and having one end adapted to engage with said teeth and the opposite end overhanging said arm, and having a coiled spring operative between it and said arm to yieldingly hold the latch in engagement with said teeth.

WILLIAM WEBBER.

Witnesses:
 Roy D. Lee,
 John W. Pridmore.